US007713650B2

(12) United States Patent
Reid

(10) Patent No.: US 7,713,650 B2
(45) Date of Patent: May 11, 2010

(54) METHOD FOR REDUCING DEGRADATION IN A FUEL CELL

(75) Inventor: Ronald M. Reid, North East, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 143 days.

(21) Appl. No.: 12/190,640

(22) Filed: Aug. 13, 2008

(65) Prior Publication Data

US 2009/0050269 A1  Feb. 26, 2009

Related U.S. Application Data

(62) Division of application No. 11/055,993, filed on Feb. 11, 2005, now Pat. No. 7,419,732.

(51) Int. Cl.
*H01M 4/00* (2006.01)
(52) U.S. Cl. ...................................... 429/40
(58) Field of Classification Search .................. 429/40; 156/344; 73/61.42, 61.72
See application file for complete search history.

(56) References Cited

U.S. PATENT DOCUMENTS

| 3,839,178 | A | * | 10/1974 | Macur | 204/415 |
|---|---|---|---|---|---|
| 4,090,931 | A | * | 5/1978 | Motani et al. | 205/525 |
| 4,101,395 | A | * | 7/1978 | Motani et al. | 205/525 |
| 5,389,505 | A | * | 2/1995 | Nishigaki | 430/506 |
| 6,007,934 | A | | 12/1999 | Auer et al. | 429/44 |
| 6,248,469 | B1 | | 6/2001 | Formato et al. | 429/41 |
| RE37,307 | E | | 8/2001 | Bahar et al. | 204/296 |
| 6,284,402 | B1 | | 9/2001 | Mallouk et al. | 429/40 |
| 6,465,136 | B1 | | 10/2002 | Fenton et al. | 429/309 |
| 6,613,203 | B1 | | 9/2003 | Hobson et al. | 204/296 |
| 6,689,505 | B1 | | 2/2004 | Albers et al. | 429/44 |
| 6,692,858 | B2 | | 2/2004 | Higuchi et al. | 429/33 |
| 6,855,453 | B2 | | 2/2005 | Bett et al. | 429/42 |
| 7,125,626 | B2 | * | 10/2006 | Kato | 429/42 |
| 2003/0091885 | A1 | | 5/2003 | Kobayashi et al. | 429/32 |
| 2004/0137292 | A1 | | 7/2004 | Takebe et al. | 429/23 |
| 2005/0026772 | A1 | | 2/2005 | Yasunaga et al. | 502/101 |

FOREIGN PATENT DOCUMENTS

| EP | 552587 A1 | 1/1992 |
|---|---|---|
| EP | 557674 B1 | 5/1997 |
| JP | 06-246160 | 9/1994 |
| WO | WO 0069009 | 11/2000 |

OTHER PUBLICATIONS

Colon-Mercado, H. R., Kim, H., & Popov, B. N. 2004, "Durability study of Pt3Ni1 catalysts as cathode in PEM fuel cells", Electrochemistry Communications, vol. 6, No. 8, pp. 795-799.
Antolini, E. 2004, "Review in Applied Electrochemistry. No. 54 Recent Developments in Polymer Electrolyte Fuel Cell Electrodes", Journal of Applied Electrochemistry, vol. 34, No. 6, pp. 563-576.
Gubler, L., Kuhn, H., Schmidt, T. J., Scherer, G. G., Brack, H. P., & Simbeck, K. 2004, "Performance and Durability of Membrane Electrode Assemblies Based on Radiation-Grafted FEP-g-Polystyrene Membranes", Fuel Cells, vol. 4, No. 3, pp. 196-207.
Taniguchi, A., Akita, T., Yasuda, K., & Miyazaki, Y. 2004, "Analysis of electrocatalyst degradation in PEMFC caused by cell reversal during fuel starvation", Journal of Power Sources, vol. 130, No. 1-2, pp. 42-49.
Yongchao Si, H. Russell Kunz, and James M. Fenton, "Nafion-Teflon-Zr PO4)2 Composite Membranes for High-Temperature PEMFCs" Journal of the Electrochemical Society 151 (4) A623-A631 (2004).
Lin, J. C., Kunz, H. R., Cutlip, M. B., & Fenton, J. M., "Preparation of high temperature composite membranes for hydrogen proton exchange membrane fuel cells", Proceedings of the 31st Mid-Atlantic Industrial and Hazardous Waste Conference held in Storrs, CT Jun. 20-23, 1999, pp. 656-663.
Van Muylder, J., DeZoubov, N., & Pourbaix, M. 1966, "Platinum," in Atlas of Electrochemical Equilibria , 1974 edn, M. Pourbaix, ed., National Association of Corrosion Engineers, Houston, TX, pp. 378-383.
Malachesky, P. A., Leung, C., & Feng, H. 1972, Degradation of platinum black fuel cell cathodes , United States Government, U.S. National Technical Information Service Ad Rep. (1972), AD 757714.
Bindra, P., Clouser, S. J., & Yeager, E. 1979, "Platinum Dissolution in Concentrated Phosphoric Acid", Journal of the Electrochemical Society, vol. 126, No. 9, pp. 1631-1632.
Aragane, J. & Murahashi, T. 1988, "Stability of PT Electrocatalyst in Phosphoric-Acid Fuel-Cell", Nippon Kagaku Kaishi No. 10, pp. 1670-1676.
Passalacqua, E., Antonucci, P. L., Vivaldi, M., Patti, A., Antonucci, V., Giordano, N., & Kinoshita, K. 1992, "The Influence of PT on the Electrooxidation Behavior of Carbon in Phosphoric-Acid", Electrochimica Acta, vol. 37, No. 15, pp. 2725-2730.
Kolde, J. A., Bahar, B., Wilson, M. S., Zawodzinski, T. A., & Gottesfeld, S. 1995, "Advanced composite polymer electrolyte fuel cell membranes", S. Gottesfeld, G. Halpert, & A. Landgrebe, eds., The Electrochemical Society, Pennington, NJ, pp. 193-201.
Meyers, J. P. & Darling, R. M. Kinetic model of platinum dissolution in PEM fuel cells. Abstracts of The Electrochemical Society 2002-2. 2002. Ref Type: Abstract.

(Continued)

*Primary Examiner*—Patrick Ryan
*Assistant Examiner*—Thomas H. Parsons
(74) *Attorney, Agent, or Firm*—Allan M. Wheatcraft

(57) ABSTRACT

The invention is a method of reducing catalyst dissolution in the cathode of a membrane electrode assembly fuel cell, the method comprising the steps of: (a) preparing a membrane electrode assembly comprising an anode, a cathode and a polymer electrolyte membrane interposed between the anode and the cathode; (b) assembling a fuel cell using the membrane electrode assembly; (c) applying a fluid comprising an oxidant to the cathode of the membrane electrode assembly; (d) applying a fluid comprising a fuel to the anode of the membrane electrode assembly; and (e) supplying a sufficient quantity of reducing agent to the cathode to maintain the average open-circuit voltage of the cathode at less than about 0.98 V.

14 Claims, 4 Drawing Sheets

OTHER PUBLICATIONS

Bahar, B., Cavalca, C., Cleghorn, S., Kolde, J., Lane, D., Murthy, M., & Rusch, G. 1999, "Effective selection and use of advanced membrane electrode power assemblies", Journal of New Materials for Electrochemical Systems, vol. 2, No. 3, pp. 179-182.

Landsman, D. A. & Luczak, F. J. 2003, "Catalyst studies and coating technologies," in Handbook of Fuel Cells—Fundamentals, Technology and Applications, vol. 4: Fundamentals and Survey of Systems edn, W. Vielstich, H. A. Gasteiger, & A. Lamm, eds., John Wiley & Sons, Ltd, New York, NY, pp. 811-831.

Cleghorn, S. J., Kolde.J., & Liu, W. 2003, "Catalyst coated composite membranes," in Handbook of Fuel Cells—Fundamentals, Technology and Applications, vol. 3: Fuel Cell Technology and Applications edn, W. Vielstich, H. A. Gasteiger, & A. Lamm, eds., John Wiley & Sons, Ltd, New York, NY, pp. 566-575.

Antolini, E. 2003, "Formation, microstructural characteristics and stability of carbon supported platinum catalysts for low temperature fuel cells", Journal of Materials Science, vol. 38, No. 14, pp. 2995-3005.

Darling, R. M. & Meyers, J. P. 2003, "Kinetic Model of Platinum Dissolution in PEMFCs", Journal of the Electrochemical Society, vol. 150, No. 11, p. A1523-A1527.

* cited by examiner

METHOD FOR REDUCING DEGRADATION IN A FUEL CELL

REFERENCE TO RELATED APPLICATION

The present application is a divisional application of U.S. patent application Ser. No. 11/055,993 filed Feb. 11, 2005 now U.S. Pat. No. 7,419,732.

FIELD OF THE INVENTION

The present invention relates to a method of reducing degradation in a fuel cell or cells to improve their durability and life and therefore their usefulness.

BACKGROUND OF THE INVENTION

Fuel cells are devices that convert fluid streams containing a fuel, for example hydrogen, and an oxidizing species, for example, oxygen or air, to electricity, heat and reaction products. Such devices comprise an anode, where the fuel is provided; a cathode, where the oxidizing species is provided; and an electrolyte separating the two. The fuel and/or oxidant typically are a liquid or gaseous material. The electrolyte is an electronic insulator that separates the fuel and oxidant. It provides an ionic pathway for the ions to move between the anode where the ions are produced by reaction of the fuel, to the cathode, where they are used to produce the product. The electrons produced during formation of the ions are used in an external circuit, thus producing electricity. As used herein, fuel cells may include a single cell comprising only one anode, one cathode and an electrolyte interposed therebetween, or multiple cells assembled in a stack. In the latter case there are multiple separate anode and cathode areas wherein each anode and cathode area is separated by an electrolyte. The individual anode and cathode areas in such a stack are each fed fuel and oxidant; respectively, and may be connected in any combination of series or parallel external connections to provide power. Additional components in a single cell or in a fuel cell stack may optionally include means to distribute the reactants across the anode and cathode, including, but not limited to porous gas diffusion media and/or so-called bipolar plates, which are plates with channels to distribute the reactant. Additionally, there may optionally be means to remove heat from the cell, for example by means of separate channels in which a cooling fluid can flow.

A Polymer Electrolyte Membrane Fuel Cell (PEMFC) is a type of fuel cell where the electrolyte is a polymer electrolyte. Other types of fuel cells include Solid Oxide Fuel Cells (SOFC), Molten Carbonate Fuel Cells (MCFC), Phosphoric Acid Fuel Cells (PAFC), etc. As with any electrochemical device that operates using fluid reactants, unique challenges exist for achieving both high performance and long operating times. In order to achieve high performance it is necessary to reduce the electrical and ionic resistance of components within the device. Recent advances in the polymer electrolyte membranes have enabled significant improvements in the power density of PEMFCs. Steady progress has been made in various other aspects including lowering Pt loading, extending membrane life, and achieving high performance at different operating conditions. However, many technical challenges are still ahead. One of them is for the membrane electrode assembly (MEA) to meet the lifetime requirements for various potential applications. These range from hundreds of hours for portable applications to 5,000 hours or longer for automotive applications to 40,000 hours or longer in stationary applications. In all cases, the membrane must not fail, and there must not be severe electrode degradation.

As is known in the art, decreasing the thickness of the polymer electrolyte membrane can reduce the membrane ionic resistance, thus increasing fuel cell power density. Within this application power density is defined as the product of the voltage and current in the external circuit divided by the geometric area of the active area in the cathode. The active area is the area in the cathode where the catalyst has access to oxidant in the cathode electrode.

However, reducing the membranes physical thickness can increase the susceptibility to damage from other device components leading to shorter cell lifetimes. Various improvements have been developed to mitigate this problem. For example, U.S. Pat. No. RE 37,307 to Bahar et al., shows that a polymer electrolyte membrane reinforced with a fully impregnated microporous membrane has advantageous mechanical properties. Although this approach is successful in improving cell performance and increasing lifetimes, even longer life would be desirable.

During normal operation of a fuel cell or stack the power density typically decreases as the operation time goes up. This decrease, described by various practitioners as voltage decay, fuel cell durability, or fuel cell stability, is not desirable because less useful work is obtained as the cell ages during use. Ultimately, the cell or stack will eventually produce so little power that it is no longer useful at all. The causes of this power loss with time are not completely understood, but are thought to occur because of various forms of degradation of the materials present in the fuel cell. For example, consider the degradation in the properties of the electrodes. Such electrode degradation mechanisms can include but are not limited to reduction of catalyst activity through reduction of effective area resulting from particle sintering or agglomeration; physical loss of the catalyst, catalyst support or ionically conducting component in the electrode; degradation of the interfaces between the electrode and adjacent components; or degradation of the interfaces within the multiple phases present within the electrode.

One of these mechanisms, the physical loss of catalyst from the electrode, is particularly relevant to this application. Under certain conditions in a fuel cell, Pt metal is thermodynamically unstable and should corrode in the electrode. [See Van Muylder, J., DeZoubov, N., & Pourbaix, M.; *Platinum*, in Atlas of Electrochemical Equilibria, 1974 edn, M. Pourbaix, ed., National Association of Corrosion Engineers, Houston, Tex., pp. 378-383]. The extent of corrosion will depend on a number of factors, including but not limited to the local conditions near the Pt in the cell, the kinetics of the dissolution reaction, and the temperature. Although the fact that Pt may corrode in the fuel cell has been understood in the art for some time, the extent to which it does so, and methods and techniques to mitigate such corrosion have not been previously delineated.

Another critical variable in the operation of fuel cells is the temperature at which the cell is operated. Although this varies by the type of system, for PEMFCs, the operating temperature is less than about 150 degrees Celsius. PEMFCs are more typically operated between 40 and 80 degrees Celsius because in that temperature range the power output is acceptably high, and the voltage decay with time is acceptably low. At higher temperature, decay rates tend to increase, and cell durability thereby decreases. It would be highly desirable to operate at higher temperatures, for example between about 90 and 150 degrees Celsius, though. By so doing the effects of potential poisons, for example carbon monoxide, would be reduced. Furthermore, above 100 degrees Celsius, flooding and other deleterious effects of water are less of an issue. Yet, with current materials and operating conditions lifetimes are unacceptably short at these higher temperatures.

Yet another factor that is currently limiting the broad acceptance of fuel cells is their cost. In part, this is due to the presence of relatively large amounts of precious metal catalysts, i.e., Pt, in the electrodes. Historically the concentration of Pt in the electrodes in state-of-the-art fuel cells has decreased from a ~5-10 mg/cm$^2$ Pt loading 30 years ago to ~1 mg/cm$^2$ today. Yet, to meet aggressive cost targets for high volume transportation applications, loading levels will need to decrease by as much as an additional order of magnitude. Such low loadings will require very low electrode degradation during cell operation because there will be no "reserve" Pt present in the electrode as there is with today's loading levels. For example, in a cell with an initial loading of 0.4 mg/cm$^2$ Pt in an electrode, if 0.1 mg/cm$^2$ becomes inactive or is lost because of degradation during fuel cell operation there will still be 0.3 mg/cm$^2$ "active" Pt catalyst available. On the other hand, the same amount of Pt activity loss in a cell that began with ~0.1 mg/cm$^2$ would lead to complete cell failure because there will be little or no Pt available to catalyze the reactions. Thus, it becomes increasingly important to reduce or eliminate electrode degradation mechanisms in fuel cells that render Pt catalytically inactive.

Although there have been many improvements to fuel cells in an effort to improve life of fuel cells, most have focused on using improved materials. Very few have focused on specific operational methods or means of operating a fuel cell that would act to maximize lifetimes or durability of a fuel cell.

SUMMARY OF THE INVENTION

The instant invention is a method of reducing catalyst dissolution in the cathode of a membrane electrode assembly fuel cell, the method comprising the steps of: (a) preparing a membrane electrode assembly comprising an anode, a cathode and a polymer electrolyte membrane interposed between the anode and the cathode; (b) assembling a fuel cell using the membrane electrode assembly; (c) applying a fluid comprising an oxidant to the cathode of the membrane electrode assembly; (d) applying a fluid comprising a fuel to the anode of the membrane electrode assembly; and (e) supplying a sufficient quantity of reducing agent to the cathode to maintain the average open-circuit voltage of the cathode at less than about 0.98 V. Alternative embodiments of the invention are to hold the open-circuit voltage to less than about 0.95 V, or less than about 0.90 V.

In other embodiments of the invention the above method may be used wherein the operation of the fuel cell is at temperatures between about 85 and 150 degrees Centigrade, or at about 90, about 100, about 110 or about 120 degrees Centigrade.

Another embodiment of the invention is the method described above wherein the sufficient quantity of reducing agent supplied to the cathode comprises hydrogen gas. Alternatively, the sufficient quantity of reducing agent supplied to the cathode is supplied to the fluid comprising an oxidant; is supplied from an external source; or from an internal source. The internal source may comprise gas that crosses over from the fluid comprising a fuel supplied to the anode.

Another embodiment of the invention is the above method wherein the polymer electrolyte membrane comprises perfluorosulfonic acid and optionally expanded polytetrafluoroethylene.

Yet another embodiment of the invention is a fuel cell comprising an anode, a cathode, a polymer electrolyte membrane interposed between the anode and the cathode, means for applying a fluid comprising an oxidant to the cathode, means for applying a fluid comprising a fuel to the anode, and means for supplying a sufficient quantity of reducing agent to the fluid comprising an oxidant to maintain the average open-circuit voltage of the cathode at less than about 0.98 V. The polymer electrolyte membrane has a thickness less than about 12 microns, or less than about 8 microns. Further, the polymer electrolyte membrane further comprises a perfluorosulfonic acid and optionally expanded polytetrafluoroethylene. The cathode in this embodiment may comprise a platinum catalyst, and may have a platinum catalyst with a loading of less than about 0.1 mg/cm2.

An additional embodiment of the invention is the method described above wherein the reducing agent supplied to the cathode comprises a solid that has a standard oxidation potential less than Pt and greater than hydrogen. The solid in this embodiment may be selected from the group consisting of noble metals, or may be selected from the group consisting of Cu, Ag, Pd, Os, Ru and Ir.

A further embodiment of the invention is a method of operating a fuel cell comprising the steps of: (a) preparing a membrane electrode assembly comprising an anode, a cathode and a polymer electrolyte membrane interposed between the anode and the cathode; (b) assembling a fuel cell using the membrane electrode assembly; (c) applying a fluid comprising an oxidant to the cathode of the membrane electrode assembly; (d) applying a fluid comprising a fuel to the anode of the membrane electrode assembly; and (e) supplying a sufficient quantity of reducing agent to the cathode to maintain the average open-circuit voltage of the cathode at less than about 0.98 V. Alternative embodiments of the invention are to hold the open-circuit voltage to less than about 0.95 V, or less than about 0.90 V.

In other embodiments of the invention the above method of operating a fuel cell may be used wherein the operation of the fuel cell is at temperatures between about 85 and 150 degrees Centigrade. Another embodiment of the invention is the method described above wherein the sufficient quantity of reducing agent supplied to the cathode comprises hydrogen gas. Alternatively, the sufficient quantity of reducing agent supplied to the cathode is supplied to the fluid comprising an oxidant, is supplied from an external source, or from an internal source. The internal source may comprise gas that crosses over from the fluid comprising a fuel supplied to the anode.

In yet another embodiment of the invention, a method to observe Pt dissolution in the electrode of a fuel cell has been discovered, the method comprising (a) Dipping the MEA into a solvent for a period of time less than 5 minutes; (b) Gently agitating and optionally gently rubbing the MEA while in the solvent to remove electrodes from the electrolyte of the MEA; (c) removing the electrolyte from the solvent to dry; and (d) determining the presence of Pt in the resulting dry membrane. The solvent in this method may be an alcohol, including but not limited to ethanol. Optionally, the method may comprising an additional step of rinsing the electrolyte in water prior to drying. The method of determining the presence of Pt in the resulting dry membrane may include, but is not limited to visual observation, x-ray fluorescence, and energy dispersive spectroscopy.

Yet another embodiment of the invention is a method to remove electrodes from a membrane electrode assembly, the method comprising (a) Dipping the MEA into a solvent for a period of time less than 5 minutes; (b) Gently agitating and optionally gently rubbing the MEA while in the solvent to remove electrodes from the electrolyte of the MEA; and (c)

removing the electrolyte from the solvent, to dry. Optionally, the method may comprising an additional step of rinsing the electrolyte in water prior to drying. The solvent in this method may be an alcohol, including but not limited to ethanol.

One additional embodiment of the invention is a method to remove one electrode from a membrane electrode assembly, the method comprising (a) gently applying solvent to one electrode of the membrane electrode assembly for a period of time less than 5 minutes; (b) gently rubbing the electrode to remove it from the membrane; (c) drying the remaining membrane/electrode composite. Optionally, this method may also comprise the additional step of rinsing the membrane in water prior to drying.

DESCRIPTION OF THE DRAWINGS

The operation of the present invention should become apparent from the following description when considered in conjunction with the accompanying figure.

DETAILED DESCRIPTION OF THE INVENTION

Figure 1:
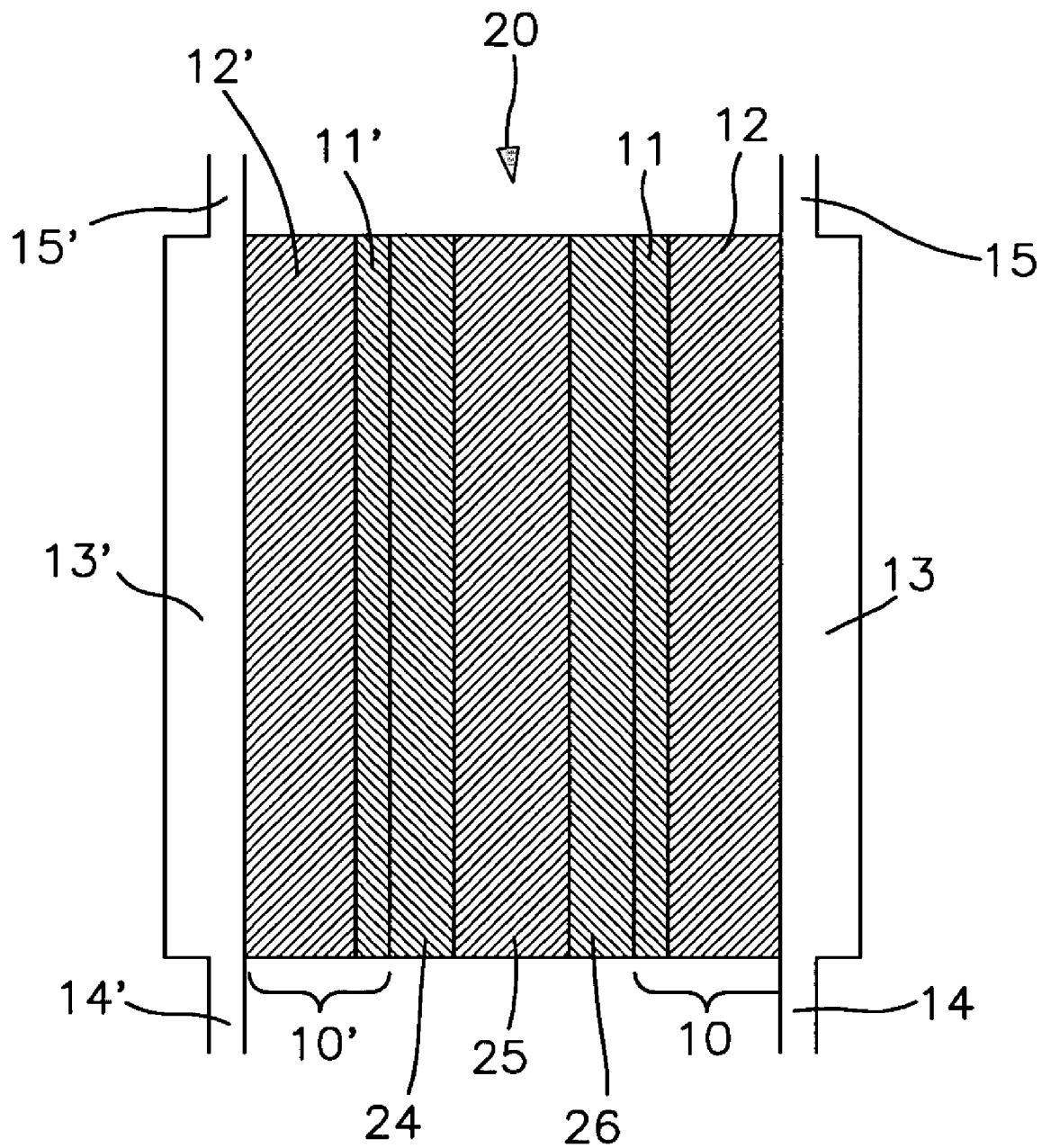
FIG. 1 is a schematic of the cross section of a single fuel cell.

The instant invention is a method of reducing Pt dissolution in an operating fuel cell. The fuel cell of the method can be of any type, for example molten carbonate, phosphoric acid, solid oxide or most preferably, a polymer electrolyte membrane (PEM) fuel cell. As shown in FIG. 1, such PEM fuel cells 20 comprise a membrane electrode assembly, which comprises an anode 24 a cathode 26 and a polymer electrolyte 25 sandwiched between them. A PEM fuel cell may optionally also include gas diffusion layers 10' and 10 on the anode and cathode sides, respectively. These GDM function to more efficiently disperse the fuel and oxidant. In FIG. 1 the fuel flows through the anode chamber 13', entering through an anode gas inlet 14' and exiting through an anode gas outlet 15'. Correspondingly, the oxidant flows through the cathode chamber 13, entering through a cathode gas inlet 14 and exiting through a cathode gas outlet 15. The cathode and anode chambers may optionally comprise plates (not shown in FIG. 1) containing grooves or other means to more efficiently distribute the gases in the chambers. The gas diffusion layers 10 and 10' may optionally comprise a macroporous diffusion layer 12 and 12', as well as a microporous diffusion layer 11 and 11'. Microporous diffusion layers known in the art include coatings comprising carbon and optionally PTFE, as well as free standing microporous layers comprising carbon and ePTFE, for example CARBEL® MP gas diffusion media available from W. L. Gore & Associates. In this application the cathode is considered to have at least one surface in contact with the cathode chamber if any portion of the cathode has access to the fluid used as oxidant. Correspondingly, the anode is considered to have at least one surface in contact with the anode chamber if any portion of the anode has access to the fluid used as fuel. The fluids used as fuel and oxidant may comprise either a gas or liquid. Gaseous fuel and oxidant are preferable, and a particularly preferable fuel comprises hydrogen. A particularly preferable oxidant comprises oxygen.

The anode and cathode electrodes comprise appropriate catalysts that promote the oxidation of fuel (e.g., hydrogen) and the reduction of the oxidant (e.g., oxygen or air), respectively. For example, for PEM fuel cells, anode and cathode catalysts may include, but are not limited to, pure noble metals, for example Pt, Pd or Au; as well as binary, ternary or more complex alloys comprising the noble metals and one or more transition metals selected from the group Ti, V, Cr, Mn, Fe, Co, Ni, Cu, Zn, Y, Zr, Nb, Mo, Ru, Rh, Ag, Cd, In, Sn, Sb, La, Hf, Ta, W, Re, Os, Ir, Ti, Pb and Bi and combinations thereof. The invention described herein is directed at such alloys above that dissolve in a fashion similar to pure Pt. Pure Pt is particularly preferred for the anode when using pure hydrogen as the fuel. Pt—Ru alloys are preferred catalysts when using reformed gases as the fuel. Pure Pt is a preferred catalyst for the cathode in PEMFCs. Non-noble metal alloys catalysts are also used, particularly in non-PEMFCs, and as the temperature of operation increases. The anode and cathode may also, optionally, include additional components that enhance the fuel cell operation. These include, but are not limited to, an electronic conductor, for example carbon, and an ionic conductor, for example a perfluorosulfonic acid based polymer or other appropriate ion exchange resin. Additionally, the electrodes are typically porous as well, to allow gas access to the catalyst present in the structure.

The catalyst loading in the fuel electrodes must be sufficient to catalyze the reactions that take place, and will depend on the details of the composition of the electrodes, including catalyst type, amount of electrical and ionically conducting phase present, and the amount of porosity present. The amount of catalyst will also depend, to some extent, on the desired lifetime and performance level of the cell. Higher levels typically have better performance and longer lifetimes, but also are more expensive, especially when the catalyst comprises precious metals. For Pt-based catalysts using perfluorosulfonic acid based ionomers, loading levels of less than 1 mg/cm$^2$ are typically used on each electrode, though lower levels are preferable when performance or lifetimes requirements allow them. The instant invention, then, may allow use of lower loadings for a given level of performance and/or lifetime because the method reduces or eliminates the amount of catalyst lost during operation. Reducing catalyst loss allows the cell to have better performance for longer periods of time.

The electrolyte 25 of the PEM fuel cell may be any ion exchange membrane known in the art. These include but are not limited to membranes comprising phenol sulfonic acid; polystyrene sulfonic acid; fluorinated-styrene sulfonic acid; perfluorinated sulfonic acid; sulfonated Poly(aryl ether ketones); polymers comprising phthalazinone and a phenol group, and at least one sulfonated aromatic compound; aromatic ethers, imides, aromatic imides, hydrocarbon, or perfluorinated polymers in which an ionic acid functional group or groups is attached to the polymer backbone. Such ionic acid functional groups may include, but is not limited to, sulfonic, sulfonimide or phosphonic acid groups. Additionally, the electrolyte 25 may further optionally comprise a reinforcement to form a composite membrane. Preferably, the reinforcement is a polymeric material. The polymer is preferably a microporous membrane having a porous microstructure of polymeric fibrils, and optionally nodes. Such polymer is preferably expanded polytetrafluoroethylene, but may alternatively comprise a polyolefin, including but not limited to polyethylene and polypropylene. An ion exchange material is impregnated throughout the membrane, wherein the ion exchange material substantially impregnates the microporous membrane to render an interior volume of the membrane substantially occlusive, substantially as described in Bahar et al, RE37,307, thereby forming the composite membrane.

The method of the instant invention comprises various approaches to maintain the electrochemical potential on the cathode of a fuel cell to values where Pt corrosion is reduced or eliminated. Because the electrochemical potential can only be measured in a relative sense, throughout this application, the electrochemical potential (or equivalently referred to herein as just potential) is measured relative to hydrogen at the cell temperature. Thus, the potential of an electrode where hydrogen at unit activity was flowing across an appropriate catalyst at room temperature would be zero volts (V), while that of oxygen at unit activity in acid conditions at the same temperature would be ~1.23 V. These values are fixed by thermodynamics and by definition of hydrogen as the reference electrode. Actual measured values in an experiment may be different depending on the actual operating conditions. The voltage across a hydrogen-air fuel cell will thus depend on thermodynamic factors, for example, temperature, pressure and the activity of the hydrogen and oxygen gases in the anode and cathode electrodes respectively, as well as kinetic factors, such as the so-called electrode overpotentials, that may preclude the potentials from reaching the theoretical thermodynamic values. Furthermore, when measuring the potential across a fuel cell with a finite active area, the potential measured in an experiment is the average electrochemical potential, i.e., the electrical voltage measured between the electrodes by contacting the entire surface of the active area. It is an average potential generated from all the local reactions occurring across the entire active area of the electrodes. Local electrochemical potentials may be higher or lower at various microscopic locations within the active area of the cell. Because these local potentials are not readily measured experimentally, they are not considered further in this application. The average open-circuit voltage, as used herein, is the average electrochemical potential of the cell when there is no external load present other than a high impedance voltage-measuring device. The specific approach for measuring the average open-circuit voltage is described below.

The average open-circuit potential of a fuel cell is primarily fixed by the reactants used in the anode and cathode, typically hydrogen (or hydrogen containing) gas and oxygen gas (usually from air). Should there be reactants present in the cathode that can be oxidized at the potentials set by the hydrogen-air reaction (~~1.2V), they will tend to do so. In fact, as is well known in the art, the catalyst used in most PEM fuel cells, Pt, is not thermodynamically stable at these potentials. Thermodynamically, it should be oxidized, or corroded, to form various dissolved Pt species. Whether it dissolves and/or the extent to which it does depends on various kinetic factors, for example the presence of a passivating layer on the Pt surface, the overpotential for dissolution, the local pH conditions, etc. Should it dissolve, though, it can migrate to other locations in the cell, or potentially even be swept out of the cell. When Pt is dissolved and migrates to locations outside the electrode, it can no longer act as a catalyst for the fuel cell reaction, and so potentially can degrade the operation of the cell.

Inventors have discovered that it is possible, surprisingly, to minimize and even prevent this Pt dissolution, either by a method of operation, or by specifically controlling the electrode and/or MEA make-up or composition. The instant invention has various aspects, but all share a common theme: using one or more of various different approaches, hold the average open circuit voltage at the cathode to values below a potential where the catalyst dissolves. In the case of Pt catalysts in hydrogen-air fuel cells, inventors have discovered that by holding the potential below about 0.98 V, Pt dissolution is reduced significantly or eliminated. The various means to accomplish this are described more fully below. Although the descriptions below use Pt catalysts in hydrogen-air fuel cells to elucidate the invention, one skilled in the art will appreciate that the methods and approaches are general. They can be used with other catalysts such as those described above, and with other fuels or oxidants, with fuel cells other than PEMFC (e.g., SOFC, MCFC, PAFC, etc.) and at various cell operating temperatures.

One embodiment of the instant invention is a method of reducing catalyst dissolution in the cathode of a membrane electrode assembly fuel cell. The method comprises the steps of: (a) preparing a membrane electrode assembly comprising an anode, a cathode and a polymer electrolyte membrane interposed between the anode and the cathode; (b) assembling a fuel cell using the membrane electrode assembly; (c) applying a fluid comprising an oxidant to the cathode of the membrane electrode assembly; (d) applying a fluid comprising a fuel to the anode of the membrane electrode assembly; and (e) supplying a sufficient quantity of reducing agent to the cathode to maintain the average open circuit voltage of the cathode at less than about 0.98 V. As used herein, reducing agents are species that tend to donate electrons or cause other species to gain electrons during reaction. Alternatively, the average open-circuit voltage may be held to less than 0.95 or 0.90 V.

The method will operate effectively at all temperatures that a fuel cell can function. Because as the temperature increases, the rate of catalyst dissolution tends to increase, the instant invention is particularly valuable at higher fuel cell operating temperatures. For PEM fuel cells with catalysts comprising Pt, the instant invention will function at all operating temperatures, but is particularly valuable at temperatures between 85 C and 150 C, and specifically at about 90, at about 100, at about 110 or at about 120 C.

The reducing agent supplied to the cathode may comprise any of a number of species that chemically are known in the art to be reducing agents. The reducing agent should be one that will hold the average open-circuit voltage low enough to reduce or prevent catalyst dissolution, but high enough so that power output is not severely impacted. Additionally, the reducing agent should not itself impact the ability of the fuel cell to operate efficiently. For example, it should not affect catalyst performance. One preferable reducing agent in this embodiment of the invention is hydrogen gas. Hydrogen gas is particularly convenient in this method because it is generally readily available because it is usually used as the fuel in the anode. In one embodiment of the invention, the reducing agent, for example hydrogen gas, is supplied externally to the oxidizing gas (e.g., air) before it enters the fuel cell. Sufficient reducing agent is mixed into the air stream to maintain the open-circuit voltage of the cathode below the desired potential of 0.98 or lower. Herein, we describe "externally" providing a reducing agent as any situation where the reducing agent is provided from outside the MEA or fuel cell, for example adding it to the gas streams of either the anode or cathode before entering the cell.

In another embodiment of the instant invention, the reducing agent is provided to the cathode internally from within the fuel cell. Herein, "internally" providing the reducing agent means any method to provide the reducing agent that is not "external" as defined above. Internally providing the reducing agent can be accomplished in several ways. The reducing agent may be present as part of the anode fluid and through the use of appropriate electrolyte membranes allowed to leak, diffuse or otherwise cross-over through the electrolyte membrane from the anode compartment into the cathode compartment. For example, in those cells using a fuel comprising hydrogen gas, the MEA can be engineered to allow or increase the amount of hydrogen that crosses over from the anode to the cathode. Hydrogen cross-over is a well known phenomenon in the fuel cell literature. The extent of hydrogen cross-over is a function of the composition of membrane, including its hydration state; temperature; hydrogen pressure; and the thickness of the membrane. Generally, in the art, hydrogen cross-over is considered to be a negative effect because the fuel that crosses over cannot be used to generate electricity, i.e., hydrogen cross-over negatively impacts fuel efficiency. We have surprisingly discovered that a low level of cross-over is positive because it will lower the cathode potential and reduce or eliminate the dissolution of the catalyst. The amount required to accomplish this is low enough that the fuel efficiency is only reduced slightly.

One specific embodiment of the invention is to provide hydrogen internally to the cathode through the use of a very thin polymer membrane. By making the membrane thinner, more hydrogen will cross over, thereby reducing the potential of the cathode. We have discovered that by using thin membranes comprising perfluorosulfonic acid and optionally expanded polytetrafluoroethylene, it is possible to reduce and even eliminate Pt dissolution. The use of membranes of different polymer compositions such as those described above will also provide the same effect, though the exact thickness required may be different for each different polymer composition. Although thin membranes tend to be less mechanically stable, the use of reinforcements such as those described in Bahar et. al., mediate this potential disadvantage. To reduce Pt dissolution in hydrogen-air fuel cells, the preferable thickness for membranes comprising perfluorosulfonic acid polymers is less than 12 microns, and even more preferable less than 8 microns thick.

Although the use of thin membranes to allow hydrogen to cross-over to the cathode to reduce or eliminate catalyst dissolution is one particularly easy approach to achieve the instant invention, one of ordinary skill in the art will recognize that there are many other means to achieve the same end. The use of a membrane with a small, controlled amount of porosity will also allow internal generation of a reducing agent (e.g., hydrogen from the anode) in the cathode by increasing cross-over compared to a dense membrane of the same thickness. Another approach is the intentional placement of a series of very small (micro or nano) holes in the membrane at regularly spaced intervals. A reducing agent with particularly high cross-over through the membrane may also be placed in the fluid supplied to the anode so that it would cross-over at a rate higher than the fuel, and thus more readily lower the cathode open-circuit voltage. Each of these means allows the internal generation of a reducing agent in the cathode that lower average open circuit voltage, thus reducing catalyst dissolution.

An alternative embodiment of the instant invention is to supply the cathode with a solid that acts to maintain the average open-circuit voltage below the critical value where Pt dissolves at the fuel cell operating conditions. Such solids would act as a sacrificial species, oxidizing or dissolving preferentially before Pt, and in so doing, maintaining the cathode potential low enough so the desirable catalyst, for example Pt, would not dissolve. In the former case where the solid oxidizes to a state that will be still be solid, for example to solid oxides or hydroxides, they could be reduced back to their un-oxidized condition during operation of the fuel cell. In such "shuttle" reactions the solids would oxidize at high potentials, for example at open-circuit conditions, and then reduce back to their original state when the fuel cell was operating at lower potentials. Solids that behave in this fashion would sustain their protection during the entire life of the cell because they would not be removed during their oxidation. Rather, they would just shuttle between the oxidized and reduced state at open-circuit and operation conditions, respectively. One solid expected to work in this fashion would be Ir, that would shuttle between Ir metal and $IrO_2$.

Alternatively, the solid added to the cathode to maintain the open-circuit potential below the critical potential where Pt dissolves could itself dissolve to an ionic species. In this case, the solid may be swept out of the cell during fuel cell operation, or it may be reduced in locations away from the electrode where it would no be effective. In this situation, the solid would only provide protection for Pt dissolution as long as it was present. When it was completely dissolved, it would no longer provide protection. Nevertheless, depending on the expected lifetime of the cell, sufficient solid may be added to protect the catalyst for enough time to make the approach viable. An example of a metal expected to act in this fashion is Ag.

Such solids are easily added to the electrode during its preparation, and can be either metals, non-metals or organic substances. They may be added to the electrode as pure species, as a supported species, i.e., small metal particles on a conductive support, e.g., carbon; or as precursors to the species that allow species formation with later processing, for example by heating or chemical treatment. Such solids must dissolve readily in fuel cell conditions, must do so at relatively high potentials so as not to severely impact power output, but at potentials below that where Pt dissolves. Upon dissolution, they must not adversely affect the fuel cell performance, for example by contaminating or poisoning the catalyst.

Specific solids to use in this embodiment may be chosen from the standard electrochemical series. Of such solids, noble metals are particularly desirable because they are readily available, and tend not to impact catalytic activity upon dissolution. As used herein, noble metals are those metals that have a positive equilibrium electrochemical potential relative to hydrogen when the reactions are written as oxidation reactions, i.e., $M \rightarrow M^+ + e-$, where M is a chemical species. These values of the equilibrium electrochemical potentials are commonly referred to in the art as the standard oxidation potentials. The solid should have a standard oxidation potential greater than 0.0 V (the standard oxidation potential of hydrogen), but less than the standard oxidation potential of Pt metal in order to protect the Pt from dissolution. Acceptable noble metals may comprise, but are not limited to, Cu, Ag, Pd, Os, Ru and Ir. Of these, Ir and Ag are particularly preferable because they have electrode potentials below the value where Pt typically dissolves, but still relatively high (greater than about 0.8 V).

Another aspect of the instant invention is a method to easily determine the extent of Pt dissolution during fuel cell testing through visual and/or other observation of the electrolyte membrane after fuel cell testing. In order to do this, the electrodes have to be removed in order to observe the bare membranes. A method to do so has been discovered, the method comprising (a) Dipping the MEA into a solvent for a period of time less than 5 minutes; (b) Gently agitating and optionally gently rubbing the MEA while in the solvent to remove electrodes from the electrolyte of the MEA; and (c) removing the electrolyte from the solvent to dry. Optionally, the membrane may be rinsed in water, preferably deionized water, prior to drying. The method may use any solvent in the art known to dissolve the ionomer used in the electrolyte, including, but not limited to alcohols, and specifically, ethanol or methanol or isopropyl alcohol. After the electrodes have been removed the presence of Pt from the electrodes may then be determined from the dry, bare membrane using any techniques known in the art, including, but not limited to visual observation, where the Pt will be observed as a light grey to dark brown coloring in the normally clear membrane; x-ray fluorescence; energy dispersive spectroscopy; infrared spectroscopy; chemical analysis using any of various techniques known in the art; x-ray diffraction, etc. Additionally, the electrodes remaining in the solvent may be collected, dried and analyzed if desired.

An additional method to remove just one electrode from an MEA has also been discovered. In this method, rather than dipping the MEA in solvent, solvent is gently applied to one electrode of the membrane electrode assembly for a period of time less than 5 minutes, and then the electrode is gently rubbed off with any dull utensil or by hand. Once removed, the remaining membrane/one electrode assembly may be dried, either directly, or preferably, after rinsing in water. The removed electrode may also be collected, dried, and analyzed if desired.

EXAMPLES

Description of Test Methods

Membrane Electrode Assemblies

Several types of MEAs were used to evaluate the instant invention in this application. The polymer electrolyte membrane in the MEAs used herein consisted of either a GORE-SELECT® composite membrane of an ePTFE-reinforced perfluorosulfonic acid ionomer (W. L. Gore & Associates, Inc. Newark, Del.), or a non-reinforced perfluorosulfonic acid membrane, NAFION® 112 ionomer membrane (E. I. Du Pont de Nemours Company, Wilmington, Del.). Various different thicknesses of the GORE-SELECT® composite membrane were used as described more fully in the examples below. The thickness of the NAFION® membrane was 50 micrometers.

In all cases, PRIMEA® Series 5510 electrodes (W. L. Gore & Associates, Inc., Newark, Del.) with a loading of 0.4 mg/cm$^2$ Pt were used as both the anode and cathode. These electrodes were laminated onto the membrane using standard procedures know in the art. In particular, the membrane was placed between two PRIMEA® 5510 electrodes and placed between platens of a hydraulic press (PHI Inc, Model B-257H-3-MI-X20) with heated platens. The top platen was heated to 180 degrees C. A piece of 0.25" thick GR® sheet (available from W. L. Gore & Associates, Elkton, Md.) was placed between each platen and the electrode. 15 tons of pressure was applied for 3 minutes to the system to bond the electrodes to the membrane. These MEAs were assembled into fuel cells as described below, and tested as described below.

Cell Hardware and Assembly

For all examples, a standard 25 cm$^2$ active area hardware was used for membrane electrode assembly (MEA) performance evaluation. This hardware is henceforth referred to as "standard hardware" in the rest of this application. The standard hardware consisted of graphite blocks with triple channel serpentine flow fields on both the anode and cathode sides. The path length is 5 cm and the groove dimensions are 0.70 mm wide by 0.84 mm deep. The gas diffusion media (GDM) used was a microporous layer of Carbel® MP 30Z from W. L. Gore & Associates combined with a macro layer of Carbel® CL (W. L. Gore & Associates). Cells were assembled with 10 mil silicone gasket having a square window of 5.0 cm×5.0 cm, and a 1.0 mil polyethylene napthalate (PEN) film (available from Tekra Corp., Charlotte, N.C.) gasket hereafter referred to as the sub-gasket. The sub-gasket had an open window of 4.8×4.8 cm on both the anode and cathode sides, resulting in a MEA active area of 23.04 cm$^2$. The assembly procedure for the cells was as follows:

1. The 25 cm$^2$ triple serpentine channel design flow field (provided by Fuel Cell Technologies, Inc, Albuquerque, N. Mex.) was placed on a workbench.
2. A 10 mil thick window-shaped CHR (Furon) cohrelastic silicone coated fabric gasket (provided by Tate Engineering Systems, Inc., Baltimore, Md.) sized so a 25 cm$^2$ GDM would fit inside it was placed on top of the flow field.
3. One piece of the GDM was placed inside the gasket so that the MP-30Z layer was facing up.
4. The window-shaped sub-gasket of polyethylene napthalate (PEN) film (available from Tekra Corp., Charlotte, N.C.) sized so it slightly overlapped the GDM on all sides was placed on top of the GDM.
5. The anode/membrane/cathode system was placed on top of the sub-gasket with anode-side down.
6. Steps (2) through (4) were repeated in reverse order to form the cathode compartment. The gasket used on the cathode side was the same as that used on the anode side.
7. The cell was placed in a vice and the eight retaining bolts were tightened to 45 in-lbs.

Fuel Cell Test Station Description

The assembled cells were tested in Fuel Cell Test Station with a Teledyne fuel cell gas unit MEDUSA RD-890B-1050/500125, and a Scribner load unit 890B. The humidity during testing was carefully controlled by maintaining the humidification bottle temperatures, and by heating all inlet lines between the station and the cell to four degrees higher than the bottle temperatures to prevent any condensation in the lines.

Description of Test Measurements

After cell assembly using the procedure outlined above and connecting the cell to the test station, the cell was started under test temperature and pressure as outlined below.

The cells were first conditioned at a fuel cell temperature of 80 degrees C. with 100 percent relative humidity inlet gases on both the anode and cathode. The gas applied to the anode was laboratory grade hydrogen supplied at a flow rate of 1.3 times greater than what is needed to maintain the rate of hydrogen conversion in the cell as determined by the current in the cell (i.e., 1.3 times stoichiometry). Filtered, compressed and dried air was supplied to the cathode at a flow rate of two times stoichiometry.

The cells were conditioned for 2 hours. The conditioning process involved cycling the cell at 80 degrees C. with fully humidified hydrogen and air between a set potential of 600 mV for one minute, 300 mV for one minute and open circuit condition for 0.5 minutes for 2 hours. Outlet pressure on both the anode and cathode sides was maintained at 200 kPa. Then a polarization curve was taken by controlling the applied potential beginning at 600 mV and then stepping the potential in 50 mV increments downwards to 400 mV, then back upward to 900 mV in 50 mV increments, recording the steady state current at every step. The open circuit voltage (OCV) was recorded between the potential step to 600 mV and the potential step to 650 mV.

After the above procedure, the cells underwent further testing involving potential cycling. The cell was repeatedly cycled between open circuit voltage (OCV) and 600 mV, holding the potential for 1 minute at each potential in an effort to accelerate catalyst dissolution. The average open circuit voltage was calculated by a straight numerical mean of the recorded open circuit voltages taken every 15 seconds throughout the test during the OCV portion of the cycle. A total of 12,000 cycles, i.e., time duration of 400 hours, was applied to each cell. During this test, the minimum flow rates at OCV for anode and cathode chambers were set at 50 and 100 cc/min, respectively. The gas stoichiometries at 0.6 V for anode and cathode were set at 1.3 and 2.0, respectively. The following measurement techniques were used during and/or after completion of the test.

Membrane Integrity

The membrane integrity before and after testing was evaluated using a physical pin-hole test, it was performed as follows:
1. The cell was taken off load, and set at open circuit condition while maintaining the cell temperature and relative humidity (RH) conditions at the inlets. The gas pressure of the cell was then reduced to ambient pressure on both anode and cathode sides.
2. The gas inlet on the cathode was disconnected from its gas supply and capped tightly. The cathode outlet was then connected to a flow meter (Agilent® Optiflow 420 by Shimadzu Scientific Instruments, Inc.). The anode inlet remained connected to the $H_2$, supply and anode outlet remained connected to the vent.
3. The anode gas flow was increased to 800 cc/min, and the anode outlet pressure was increased to 2 psi above ambient pressure.
4. The amount of gas flow through the cathode outlet was measured using the flow meter.
5. Determination of whether the membrane had failed or not was made from the magnitude of the measured flow on the flow meter. The criteria for failure was established as the leak rate when the $H_2$ cross-over rate was higher than 2.5 $cm^3$/min hydrogen at standard conditions (which is equivalent to 15 $mA/cm^2$ cross over current density in a cell with active area of 23.04 $cm^2$.)

Scanning Electron Microscopy (SEM)

After the cycling tests, the MEAs were taken out of the cell assembly. Small sections of the MEA were cut from the MEAs using a sharp blade, and mounted to observe the cross-section of the MEA using an SEM (Hitachi S4700). Micrographs of representative regions were recorded in secondary electron mode, and where appropriate, other tests, for example energy dispersive spectroscopy (EDS) were also performed. In particular, the presence of catalyst, (i.e. Pt) in the membrane was recorded and if present, its composition confirmed using EDS.

Visual Inspection of Bare Membrane

After performing SEM, all the MEA samples were subjected to an "alcohol dipping" process to remove both electrodes from the membrane. It was performed at room conditions as follows:

1. The entire active area of the MEA was dipped into reagent grade alcohol (EMD Chemicals Inc.) for a time long enough to loosen the bond between the membrane and the electrodes, typically a few seconds.
2. The MEA was taken out, and immediately soaked in a de-ionized water bath, stirring gently until the electrodes came off from the membrane. In some cases, a soft plastic spatula was used to gently assist in removing the electrodes.
3. Steps 1-2 were repeated, as required, in cases where some portions of the electrodes were not completely removed.
4. The bare membrane was then gently constrained, for example with paper clips or other light weights, and hung to dry at room condition for a few hours.
5. The dried membrane was then examined visually for signs of discoloration, membrane thinning, or other membrane defects.
6. Finally, the amount of Pt in the bare membranes was measured using a bench-top x-ray fluorescence unit (XRF from SPECTRO TITAN, Kleve, Germany) pre-calibrated to display Pt content in units of mg Pt per $cm^2$ surface area.

Comparative Examples C1-C3

Figure 2:
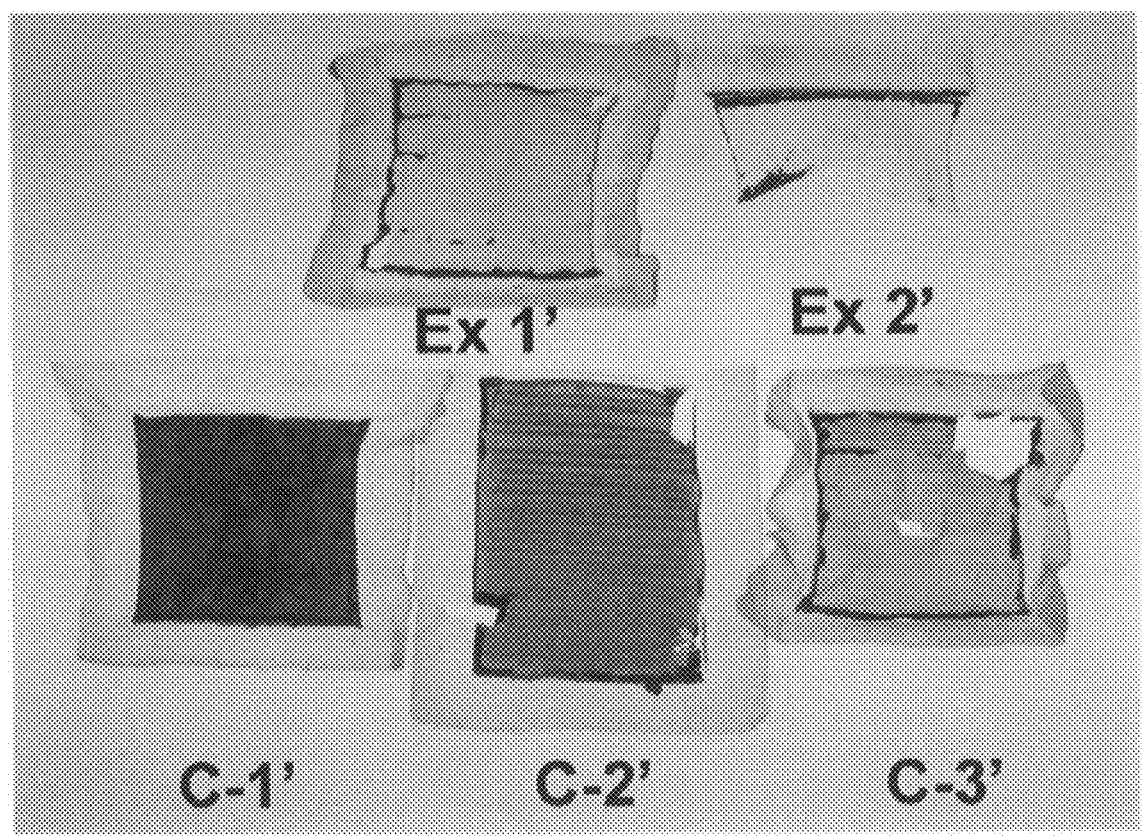
FIG. 2 is a photograph of membranes removed after fuel cell testing illustrating comparative examples, C-1 and C2, C-3 compared to examples using the instant invention.
Figure 3:
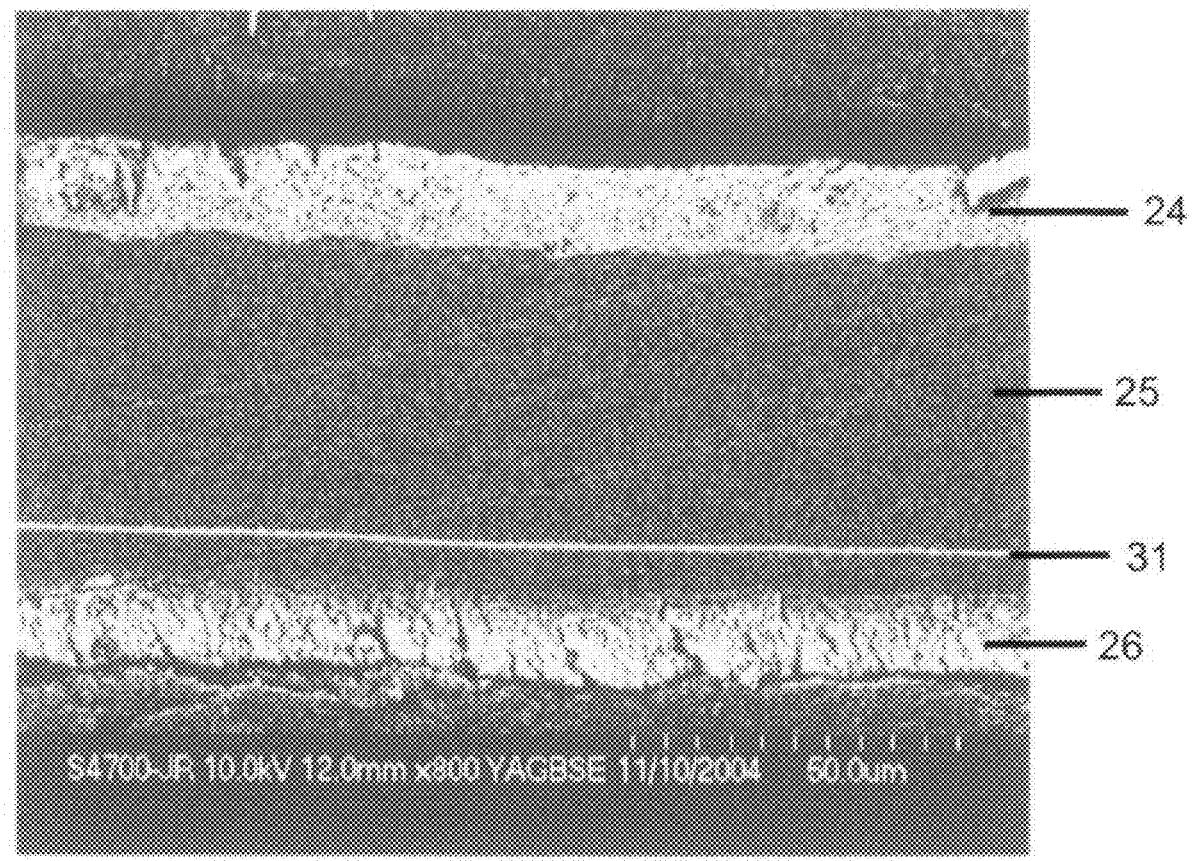
FIG. 3 is a scanning electron micrograph showing the cross-section of the membrane electrode assembly used in Comparative Example 1 removed after fuel cell testing.

Cells were assembled and tested using the conditions shown in Table 1. Example C-1 and C-3 used 35 micron GORE-SELECT® membrane, while Example C-2 used a 50 micron NAFION® membrane. These membranes and corresponding MEAs made from these membranes are well known in the art. The difference in Example C1 and C2 was the humidity on the cathode, which was increased from 0% in C-1 to 50% in C-3. The results (Table 2) indicate that in all three cases there was substantial Pt lost from the electrode that migrated into the membrane. The presence of Pt in the membrane was confirmed by visual observation (FIG. 2), x-ray fluorescence measurement (Table 2), and SEM micrographs (FIG. 3). The Pt appeared in a single band 31 near the cathode (FIG. 3), and it composition as Pt was confirmed using x-ray mapping in the SEM.

Examples 1-2

Figure 4:
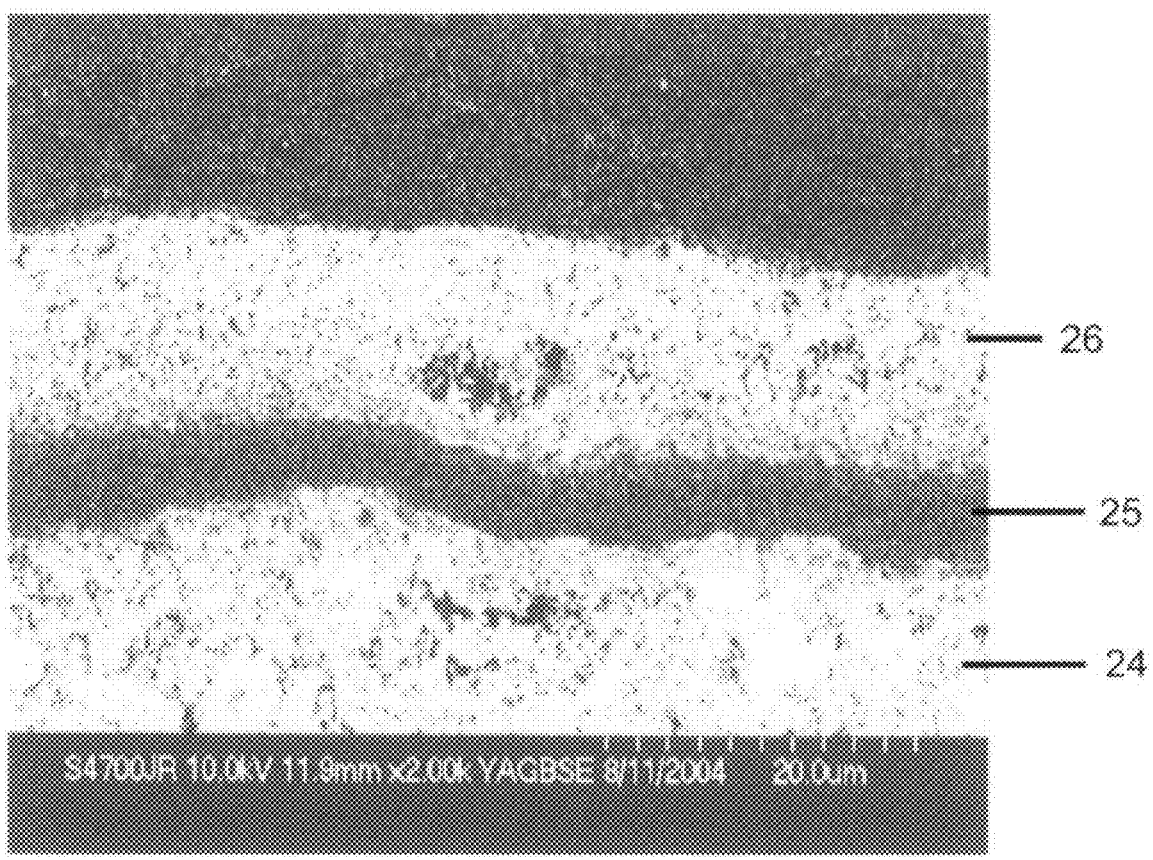
FIG. 4 is a scanning electron micrograph showing the cross-section of the membrane electrode assembly used in Example 1 removed after fuel cell testing.

Two cells were assembled and tested to confirm the instant invention. In Example 1, a reducing agent, in this case, hydrogen, was supplied to the cell externally by adding hydrogen gas flowing at 2.5 $cm^3$/min hydrogen at standard conditions to the air being supplied to the cathode as the oxidant. The hydrogen was added at this flow rate through the entire test protocol. In Example 2, the reducing agent, in this case hydrogen, was supplied internally by manipulating the membrane through the use of a very thin GORE-SELECT® membrane to increase hydrogen cross-over. The cell operating conditions were identical to those used in Comparative Example C-3. The results (Table 2) indicate that in Example 1 the extent of Pt dissolution was far less than in Comparative Example C-3, which used the same operating conditions. The reduction or absence of Pt in the membrane was confirmed by visual observation (FIG. 2), x-ray fluorescence measurement (Table 2) and SEM observation. In the case of Example 2, the Pt dissolution was completely eliminated—none of the tests showed any Pt in the membrane (FIG. 2, FIG. 4 and Table 2).

TABLE 1

Test Parameters for Comparative Examples and Inventive Examples

| Ex. | Membrane Type | Cell Temp (° C.) | Inlet RH (anode/cathode, %) | Gas Component in Cathode Chamber | Average Open Circuit Voltage (V) |
|---|---|---|---|---|---|
| C-1 | 35 micron GSM | 100 | 50/50 | Air | 0.983 |
| C-2 | Nafion ® 112 | 100 | 50/50 | Air | 0.991 |
| C-3 | 35 micron GSM | 110 | 50/0 | Air | 1.035 |
| 1 | 35 micron GSM | 110 | 50/0 | 2.5 cm$^3$/min H$_2$ (at Std. Conditions) in Air | 0.958 |
| 2 | 5 micron GSM | 110 | 50/0 | Air | 0.939 |

TABLE 2

Results for Comparative Examples and Inventive Examples

| Example | Membrane Integrity after test | Color of Bare Membrane | Presence of Pt by SEM | Pt Content in Bare Membrane by XRF (mg/cm$^2$) |
|---|---|---|---|---|
| C-1 | Not failed | Dark grey | Not performed | 0.182 |
| C-2 | Failed | Dark brown | Present | 0.136 |
| C-3 | Not failed | Brown | Present | 0.066 |
| 1 | Not failed | Light brown | Present, amount much less than C-2 and C-3 | 0.020 |
| 2 | Not failed | Colorless | Not present | 0.00 |

While particular embodiments of the present invention have been illustrated and described herein, the present invention should not be limited to such illustrations and descriptions. It should be apparent that changes and modifications may be incorporated and embodied as part of the present invention within the scope of the following claims.

I claim:

1. A method to remove electrodes from a membrane electrode assembly, said method comprising
    a. Dipping the MEA into a solvent for a period of time less than 5 minutes;
    b. Gently agitating and optionally gently rubbing said MEA while in said solvent to remove electrodes from the electrolyte of said MEA;
    c. Removing said electrolyte from said solvent to dry.

2. The method of claim 1 wherein said solvent is an alcohol.

3. The method of claim 2 wherein said solvent is ethanol.

4. The method of claim 1 comprising an additional step of rinsing said electrolyte in water prior to drying.

5. The method of claim 1 comprising the additional step of collecting the electrodes from said solvent.

6. A method to remove one electrode from a membrane electrode assembly, said method comprising
    a. Gently applying solvent to one electrode of said membrane electrode assembly for a period of time less than 5 minutes;
    b. Gently rubbing said electrode to remove it from the membrane;
    c. Drying remaining membrane/electrode composite.

7. The method of claim 6 comprising the additional step of rinsing the membrane in water prior to drying.

8. A method to observe Pt dissolution from the electrodes in an MEA, said method comprising
    a. Dipping the MEA into a solvent for a period of time less than 5 minutes;
    b. Gently agitating and optionally gently rubbing said MEA while in said solvent to remove electrodes from the electrolyte of said MEA;
    c. Removing said electrolyte from said solvent to dry;
    d. Determining the presence of Pt in the resulting dry membrane.

9. The method of claim 8 wherein said solvent is an alcohol.

10. The method of claim 9 wherein said solvent is ethanol.

11. The method of claim 8 comprising an additional step of rinsing said electrolyte in water prior to drying.

12. The method of claim 8 wherein visual observation is used to determine the presence of Pt in said dry membrane.

13. The method of claim 8 wherein x-ray fluorescence is used to determine the presence of Pt in said dry membrane.

14. The method of claim 8 wherein energy dispersive spectroscopy is used to determine the presence of Pt in said dry membrane.

* * * * *

UNITED STATES PATENT AND TRADEMARK OFFICE
CERTIFICATE OF CORRECTION

PATENT NO. : 7,713,650 B2  Page 1 of 1
APPLICATION NO. : 12/190640
DATED : May 11, 2010
INVENTOR(S) : Ronald M. Reid It is certified that error appears in the above-identified patent and that said Letters Patent is hereby corrected as shown below:

At column 6, line 13: change "Ti" to "TI".

Signed and Sealed this

Twenty-second Day of June, 2010

David J. Kappos
*Director of the United States Patent and Trademark Office*